United States Patent [19]

Suga et al.

[11] Patent Number: 5,194,490
[45] Date of Patent: Mar. 16, 1993

[54] PREPARATION PROCESS OF POLYMERIC SOLID ELECTROLYTE

[75] Inventors: Masanobu Suga; Hiroshi Kobayashi; Nobuyuki Kuroda, all of Yokohama; Kazuo Matsuura, Ota; Seiichi Akita, Fujisawa, all of Japan

[73] Assignee: Nippon Oil Co., Ltd., Tokyo, Japan

[21] Appl. No.: 668,889

[22] Filed: Mar. 13, 1991

[30] Foreign Application Priority Data

| Mar. 15, 1990 | [JP] | Japan | 2-062685 |
| Jan. 18, 1991 | [JP] | Japan | 3-016893 |
| Jan. 21, 1991 | [JP] | Japan | 3-019158 |

[51] Int. Cl.$^5$ .......................... C08K 5/06; H01M 6/18
[52] U.S. Cl. .................................. 524/755; 524/280; 524/317; 524/366; 524/378; 524/420; 524/421; 524/428; 524/435; 524/415; 524/405; 429/192
[58] Field of Search ................ 492/192; 524/755, 280, 524/317, 366, 378, 405, 415, 420, 421, 428, 435

[56] References Cited

U.S. PATENT DOCUMENTS 4,908,283  3/1990  Takahashi et al. ................. 429/192

OTHER PUBLICATIONS

Patent Abstracts of Japan, vol. 12, No. 176, May 25, 1988, p. 161, Japanese Kokai 62-285954 (A).

Primary Examiner—Joseph L. Schofer
Assistant Examiner—Jeffrey T. Smith
Attorney, Agent, or Firm—Cushman, Darby & Cushman

[57] ABSTRACT

The invention provides a process for readily preparing polymeric solid electrolyte, i.e., ion conductive polymer having excellent properties.

The process of the invention comprises steps of subjecting at least one of the following component A and component B to contain an alkali metal salt and/or an ammonium salt and mixing the components A and the component B.

Component A: a solution obtained by dissolving a radical polymerization promotor in a specific polyether base macromonomer.

Component B: a solution obtained by dissolving a radical polymerization initiator in a specific polyether base oligomer and/or an organic non-aqueous solvent.

To at least one of the component A and component B, a radical polymerization retarder is added, if desired.

The process of the invention can be carried out by a simple step comprised of mixing the two components at room temperature and provides the solid polyelectrolyte having a high inonic conductivity.

The high-ion-conductive solid polyelectrolyte prepared by the process of the invention is very useful as a raw material for lithium cells, plastic cells, large capacity electrostatic capacitors, electrochromic displays and other overall solidificated systems.

24 Claims, No Drawings

PREPARATION PROCESS OF POLYMERIC SOLID ELECTROLYTE

BACKGROUND OF THE INVENTION

1. Field of the Invention

The present invention relates to an ion-conductive polymer, that is, a polymeric solid electrolyte.

2. Description of the Related Art

Development of organic polymeric solid electrolytes have recently been progressed because of characteristics such as (1) good processing ability and readiness in forming a film having a large area and (2) high flexibility and excellent adhesion to electrodes as compared with inorganic solid electrolytes.

As to the polymeric solid electrolytes, M. B. Armand et al. have proposed mixtures of polyethylene oxide and alkali metal salts in "Fast Ion Transport in Solids", page 131, published from North Hollaud Publishing Co. (1979).

However, preparation of the solid electrolyte is carried out by a so-called casting method where the solid electrolyte is dissolved in a solvent, cast on a molding surface and successively dried by removing the solvent to form a film. Consequently, the processing procedures are complex, the resulting film has a conductivity of $10^{-6}$ S/cm or less at room temperature and the adhesion of the film to the electrodes is also unsatisfactory. Thus the improvement of the film has been strongly desired.

In addition, Japanese Laid-Open Patent 48716 (1987) has disclosed a crosslinking process by reacting trifunctional polyethylene glycol with a diisocyanate derivative. Japanese Laid-Open Patent 285954 (1987) has also disclosed a crosslinking process by polymerization reaction of polyethylene glycol diacrylate. However, solvents are used in any of these processes and a drying step is inevitable for removing the residual solvent after finishing the reaction. Further improvement on the balance of properties including ionic conductivity and adhesion to electrodes has been required. On the other hand, the polymeric solid electrolyte remarkably decreases ionic conductivity in a low temperature region below ordinary temperature. Improvement has also been required on the problem.

SUMMARY OF THE INVENTION

As a result of an extensive investigation in order to overcome the above mentioned problems, the present inventors have found that a preparation process of a polymeric solid electrolyte which give s desired curing rate after mixing component A with component B and additionally can also control with ease an initial curing rate can be provided in the entire absence of a solvent which remains after finishing the polymerization reaction and is required to remove. The inventors have also found that the polymeric solid electrolyte thus obtained has an ionic conductivity exceeding $10^{-6}$ S/cm at 0° C. and that the polymeric solid electrolyte has good adhesion to electrodes. Thus the invention has been fortunately completed.

The aspect of the present invention is a preparation process of a polymeric solid electrolyte comprising subjecting at least one of the following component A and component B to contain an alkali metal salt and/or an ammonium slat and mixing the component A with the component B to form said solid polyelectrolyte.

Another aspect of the invention is a preparation process of the polymeric solid electrolyte comprising subjecting at leas tone of the component A and the component B to contain a polymerization retarder, if desired.

The component A is a solution obtained by dissolving a radical polymerization promotor in a compound represented by the formula (1):

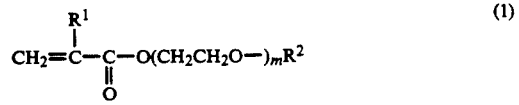

wherein $R^1$ is a hydrogen atom or an alkyl group having from 1 to 5 carbon atoms, $R^2$ is an alkyl group having from 1 to 5 carbon atoms, and m is an integer of $2 \leq m \leq 30$.

The component B is a solution obtained by dissolving a radical polymerization initiator in a compound represented by the formula (2):

wherein $R^3$ and $R^5$ are alkyl groups having from 1 to 5 carbon atoms, $R^4$ is a hydrogen atoms or an alkyl group having from 1 to 3 carbon atoms, and n is an integer of $2 \leq n \leq 30$, and/or in a compound represented by the formula (3):

$$R^6-(O-)_pR^7-(X-)_qR^8-(O-)_rR^9 \quad (3)$$

wherein X is

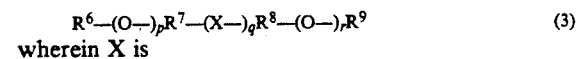 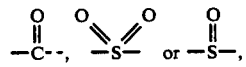

$R^6$ is a hydrocarbon group having from 1 to 6 carbon atoms, $R^7$ is a hydrocarbon group having from 1 to 6 carbon atoms, $R^7$ and $R^8$ are single bonds or divalent hydrocarbon groups having from 1 to 3 carbon atoms, $R^9$ is a hydrocarbon group having from 1 to 6 carbon atoms or a cyano group, $R^6$ and $R^9$ may be connected with each other to form a ring, and p, q and r are individually 0 to 1 and $p+q+r>0$, $R^9$ is cyano exclusive.

DETAILED DESCRIPTION OF THE INVENTION

The process of the invention is a preparation process of a polymeric solid electrolyte by mixing the component A and the component B, at least one of which contains the alkali metal salt and/or the ammonium salt that is, the component A which is a solution obtained by dissolving the radical polymerization promotor in the compound represented by the formula (1) and the component B which is a solution obtained by dissolving the radical polymerization initiator in the compound represented by the formula (2) and/or the compound represented by the formula (3).

Further, the process of the invention uses the polymerization retarder, if desired, which is added to at least one of the component A and the component B.

The compound of the formula (1) for use in the invention is, as illustrated by the structural formula, a polyether base macromonomer having oxyethylene units in the side chain and is liquid at ordinary temperature.

In the formula (1), $R^1$ is a hydrogen atom or an alkyl group having from 1 to 5, preferably from 1 to 3 carbon atoms. Exemplary $R^1$ includes a hydrogen atom, a methyl, ethyl, propyl, isopropyl and butyl group, preferably a hydrogen atom, a methyl and ethyl group.

$R^2$ is an alkyl group having from 1 to 6, preferably from 1 to 3 carbon atoms and includes a hydrogen atom, a methyl, ethyl, propyl, isopropyl, butyl and pentyl group, preferably a methyl, ethyl and propyl group.

The number of oxyethylene units in the compound represented by the formula (1), that is, the number of m is $2 \leq m \leq 30$, preferably $2 \leq m \leq 20$, more preferably $3 \leq m \leq 15$.

The compounds represented by the formula (1) which have the number of oxyethylene units in the above range include, for example, methoxypolyethylene glycol methacrylate, ethoxypolyethylene glycol methacrylate, methoxypolyethylene glycol acrylate and ethoxypolyethylene glycol acrylate.

The radical polymerization promotors used in the invention are soluble in the compound represented by the formula (1). No particular limitation is imposed upon the promotors so long as having activity for reducing the radical polymerization initiators described below.

Promotors include, for example, various anilines, amines, reductive transition metal compounds and sulfur containing compounds Exemplary promotors include anilines such as aniline, N,N-dimethylaniline, N,N-diethylaniline and N,N-dibutylaniline; amines such as triethylamine, diethylamine, piperidine and N,N-diaminoethane; Fe (II) salts such as $FeCl_2 \cdot nH_2O$, FeS and $FeSO_4$; Co(II) salts such as $CoCl_2$, $CoBr_2$, $CoSO_4$ and CoS; Mo(V) salts such as $MoCl_5$; thiols such as methanethiol, ethanethiol, benzenethiol, phenylmethanethiol, 1,4-butanethiol and p-mercaptobenzoic acid; thiol salts such as potassium ethanethiolate and sodium ethanethiolate; sulfides such as diethyl sulfide, ethylthiobenzene, 1,2-bis(methylthio)ethane, 4,4'-thiodibenzoic acid, 3-(methylthio)propanol, bis[(ethylthio)methyl]sulfide, thiocycloctane, 1,2-dithiane and 2,3-dihydro-1,4-dithiophthalene; various sulfite salts and sulfinic acids. Preferred promotors include, for example, aniline, N,N-diemthylaniline, N,N-diethylaniline, triethylamine, $FeSO_4$, $FeCl_2 \cdot nH20$, ethanethiol, benzenethiol, sodium ethane thiolate and diethyl sulfide.

The component A is a solution containing the radical polymerization promotor in the compound represented by the formula (1). The concentration of the radical polymerization promotor in the component A is in the range of from 0.01 to 10 wt. %, preferably in the range of from 0.05 to 5 wt. %.

Further addition of a polyether compound having acryloyl groups at both ends to the component A is also carried out preferably. The amount of addition is usually 50 parts by weight or less, preferably in the range of from 1 to 50 parts by weight more preferably in the range of from 1 to 30 parts by weight per 100 parts by weight of the compound represented by the formula (1).

Preferred polyether compound is represented, for example, by the formula (4);

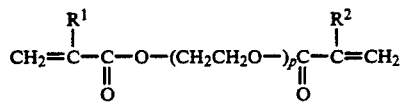

wherein $R^1$ and $R^2$ are alkyl groups having from 1 to 5, preferably from 1 to 3 carbon atoms or hydrogen atoms, $R^1$ and $R^2$ may be the same or different, and p is an integer of from 4 to 30, preferably from 5 to 20. Compounds having acryl groups or methacryl groups are particularly exemplified as suitable substances.

The compound which is used in the invention and represented by the formula (2):

is, as illustrated by the structural formula, a polyether oligomer having terminal alkyl ether groups at both ends and is liquid at ordinary temperature.

In the formula (2), $R^4$ is a hydrogen atom or an alkyl group having from 1 to 3 carbon atoms and exemplary oxyalkylene units include, for example, oxyethylene unit, oxypropylene unit and oxybuthylene unit. Two or more oxyalkylene units may be present in combination.

The number n of the oxyalkylene units is $2 \leq n \leq 30$, preferably $2 \leq n \leq 20$, more preferably $3 \leq n \leq 15$. $R^3$ and $R^5$ in the formula are alkyl groups having from 1 to 5, preferably from 1 to 3 carbon atoms and exemplified by methyl, ethyl, propyl and isopropyl groups.

Representative oxyalkylene compounds include, for example, dimethoxypolyethylene glycol, diethoxypolyethylene glycol, dipropoxypolyethylene glycol, dimethoxypolypropylene glycol, diethoxypolypropylene glycol, dimethoxypolyethylene-propylene glycol and dimethoxypolyethylene-butylene glycol.

The compound represented by the formula (3):

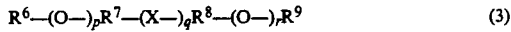

is an organic non-aqueous solvent which is liquid at room temperature.

In the formula (3), $R^6$ is a hydrocarbon group having from 1 to 6, preferably from 1 to 4 carbon atoms and includes, for exmaple, alkyl groups such as a methyl, ethyl, propyl, isopropyl, butyl, sec-butyl, tert-butyl, isobutyl and pentyl group; and aryl groups such as a phenylene group. $R^7$ and $R^8$ are single bonds in divalent hydrocarbon groups having from 1 to 3 carbon atoms and includes, for example, alkylene groups such as methylene, ethylene, trimethylene and propylene groups; and acrylene groups such as a phenylene group.

$R^9$ is a cyano group of hydrocarbon group having from 1 to 6, preferably from 1 to 4 carbon atoms Exemplary hydrocarbon group is the same as $R^6$. $R^6$ and $R^9$ may connect with each other to from a ring. In such a case, $R^6$ and $R^9$ respectively constitute a portion of the divalent hydrocarbon group in addition to the above exemplified hydrocarbon groups. The divalent hydrocarbon group has from 2 to 6 carbon atoms and includes, for example, alkylene groups such as ethylene trimethylene, propylene and tetramethylene groups.

p, q and r are individually, 0 or 1, and $p+q+r>0$, $R^9$ is a cyano group exclusive. X is

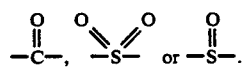

The compound represented by the formula (3) exemplifies ethylene carbonate, propylene carbonate, γ-butyrolactone, dimethoxyethane, acetonitrile, dimethyl sulfoxide, dioxolane and sulfonane.

The compound of the formula (3) for use in the invention can be employed regardless dielectric constant.

The compound having a dielectric constant of 30 or more is preferred in particular.

The radical polymerization initiator used for the invention is soluble in the compound represented by the formula (2) and/or by the formula (3). No particular restriction is imposed upon the compound so long as the compound generates a radical with ease organic peroxides are exemplified as suitable substances and include dialkyl peroxide, diacyl peroxides, peroxy esters, hydroperoxides and ketone peroxides. Exemplary compound includes benzoyl peroxide, 2,4-dichlorobenzoyl peroxide, dodecyl peroxide, dicumyl peroxide, methyl ethyl peroxide, cyclohexanone peroxide, cumene hydroperoxide, t-butylperoxy acetate, t-butylperoxy isobutyrate, t-butyleproxy pivalate, acetyl peroxide, diisopropylperoxy carbonate, paramethane hydroperoxide, diisopropylbenzene hydroperoxide and propionyl peroxide. Exemplarily preferred compound includes benzoyl peroxide, t-butylperoxy isobutyrate, acetyl peroxide and methyl ethyl peroxide.

The component B is a solution of the radical polymerization initiator in the compound of the formula (2) and/or the compound of the formula (3). The concentration of the radical polymerization initiator in the component B is in the range of from 0.01 to 10 wt. %, preferably in the range of from 0.05 to 5 wt. %.

When the compound of the formula (2) is used in combination with the compound of the formula (3), no particular restriction is imposed upon the ratio of the compounds used. The weight ratio of the compound of the formula (2) to that of formula (3) is usually in the range of from 99:1 to 1:99, preferably in the range of from 90:10 to 10:90.

In the present invention, the above component A and/or the component B contain the alkali metal salt and/or the ammonium salt, and further contain the radical polymerization retarder optionally and additionally.

No particular restriction is put on the radical polymerization retarder so long as having activity to forbid or inhibit the radical polymerization reaction. Exemplary retarders are stable organic radicals including organic oxygen radicals or organic nitrogen radicals such as 1,1-diphenyl-2-picrylhydrazyl (DDPH), 1,3,5-triphenylverdazyl (VDZ), 2,6-di-tert-butyl-a-(3,5-di-tert-butyl-4-oxo-2,5-cyclohexadiene-1-ylidene-p-tolyloxyl (Galvinoxyl), 2,2,6,6-tetramethyl-4-piperidone-1-oxyl, N-(3-N-oxyanilino-1,3-dimethyl-butylidene)-anilinoxide and tri-p-nitrophenylmethyl; higher valent metal salts such as ferric chloride, ferric bromide and cupric chloride; quinones such as hydroquinone; and organic sulfur compounds such as dithiobenzoyl disulfide. Particularly preferred inhibitors are DPPH and other stable radicals. The term "stable" in the stable radicals refers in the invention to be stable usually in the range of from 0° to 50° C., preferably in the range of from 5° to 40° C.

As to the amount of the above radical polymerization retarder to be added, the mole ratio of radical polymerization retarder/radical polymerization initiator is usually 2 or less preferably in the range of from 0.001 to 1.5, more preferably in the range of rom 0.01 to 1.0. Of course, combined use of radical polymerization initiators can also be possible.

No particular limitation is imposed upon the alkali metal salt and the ammonium salt so long as being soluble in the compound of the formula (1), the compound of the compound (2) or the compound of the formula (3). The alkali metal salts include, for example, alkali metal perchlorates such as lithium perchlorate, sodium perchlorate and potassium perchlorate; alkali metal salts of tetrafluoroborate such as lithium tetrafluoroborate, sodium tetrafluoroforate and potassium tetrafluoroborate; alkali metal salts of hexafluorophosphate such as lithium hexafluorophosphate and potassium hexafluorophosphate; alkali metal trifluoroacetates such as lithium trifluoroacetate; and alkali metal salts of trifluoromethane sulfonic acid such as lithium trifluoromethane sulfonate.

The ammonium salts include, for example, quaternary ammonium perchlorate such as tetraethylammonium perchlorate, tetraisopropylammonium perchlorate and tetra-n-butyl ammonium perchlorate; quaternary ammonium tetrafluoroborates or quaternary ammonium hexafluorophosphates such as tetraethylammonium tetrafluoroborate, tetra-n-butylammonium tetrafluoro borate, tetraethylammonium hexafluorophosphate and tetra-n-butylammonium hexafluorophosphate; and quaternary ammonium trifluoromethane sulfonates such as tetra-n-butylammonium trifluoromethane sulfoante.

The content of the above alkali metal salt or the ammonium salt is preferably in the range of from 1 to 30 parts by weight, more preferably in the range of from 3 to 20 parts by weight per 100 parts by weight of the sum of the component A and the component B.

In the preparation process of the polymeric solid electrolyte of the invention, the component A and the component B are mixed and then cured. In the mixing procedures, no particular limitation is placed on the mixing ratio of the component A to the component B so long as the object of the invention is not impaired. The weight ratio of the component A to the component B is usually in the range of from 1:10 to 0:1, preferably in the range of 1:5 to 5:1.

Excess of the component A is liable to decrease the ionic conductivity of formed solid polyelectrolyte. On the other hand, excess of the component B tends to deteriorate film strength of the resulting polymeric solid electrolyte.

The temperature for mixing the component A with the component B is usually in the range of from 0° to 50° C., preferably in the range of from 5° to 40° C. The handling procedures must, of course, be carried out in an inert atmosphere such as nitrogen and argon.

When the radical polymerization retarder is used in the process of the invention, the component A is mixed with the component B and thereafter induction period is elapsed for some time before starting cure. No other treatment is required in particular. The curing is usually in the range of from 0° to 50° C., preferably from 5° to 40° C. The curing time is suitably determined depending upon charged amount of each component, temperature and other various conditions and is usually in the range of from 5 minutes to 5 hours, preferably from 10 minutes to 3 hours in view of productivity.

In the invention, organic non-aqueous solvents such as propylene carbonate, ethylene carbonate, dimethoxyethane and dimethyl sulfoxide may be present in the component A so long as the object of the invention is not impaired. The amount of the non-aqueous solvents is usually 80 wt. % or less, preferably in the range of from 1 to 80 wt. %, more preferably from 5 to 60 wt. % of the total amount.

According to the process of the invention, mere admixture of the component A and the component B can cure the mixture of these two components at low temperatures. The procedure is simple and very favorable as a process for preparing the polymeric solid electrolyte.

In the conventional casting method which uses a solvent, the step for drying and removing the remaining solvent is inevitable after finishing the polymerization reaction. The process of the invention can carry out the polymerization reaction in the substantial absence of the solvent to be removed. Naturally stripping step of the solvent becomes unnecessary. Further, film can be directly formed on the electrode and thus adhesion of the film to the electrode is good.

In the preparation of the polymeric solid electrolyte of the invention, admixture of the component A and the component B can be suitably carried out in the presence of a porous synthetic resin film such as porous polypropylene and polypropylene non-woven fabric which are generally used for a separator of cells.

The process for preparing the polymeric solid electrolyte is to merely mix both components at room temperature and is hence very simple and extremely favorable as manufacturing steps.

The polymeric solid electrolyte thus obtained has a high ionic conductivity of $10^{-6}$ S/cm at 0° C. and a good adhesion to the electrode. Thus the polymeric solid electrolyte can be applied to broad uses as a solid ionics element for overall solidification of lithium cells, plastic cells, large capacity electrostatic capacitors and electrochromic displays.

EXAMPLES

The present invention will hereinafter be illustrated further in detail by way of examples. However, these examples are intended to illustrate the invention and are not to be construed to limit the scope of the invention.

EXAMPLE 1

Component A was prepared by mixing 10.0 g of methoxypolyethylene glycol monomethacrylate (M90G; manufactured by Shin-nakamura Chemical Industry Co.) having an oxyethylene unit number of 9 and 0.1 g of N,N-dimethylaniline.

Component B was prepared by mixing 10.0 g of polyethylene glycol dimethyl ether (U-NOX DM200; manufactured by Lion Co.) having an oxyethylene unit number of about 4, 0.83 g of lithium perchlorate and 0.06 g of benzyl peroxide. The component A and the component B were mixed at 25° C. in a weight ratio of 1:1 and immediately cast on a polypropylene plate at room temperature. A gel like film having no bleeding was obtained after 15 minutes.

Ionic conductivity of the film was measured with an A. C. impedance method. Conductivity was $2.3 \times 10^{-5}$ S/cm at 3.0° C.

EXAMPLE 2

Component A was prepared by mixing 10.0 g of methoxypolyethylene glycol monomethacrylate used in Example 1 and 0.1 g of triethylamine.

Component B was prepared by mixing 5.0 g of polyethylene glycol dimethyl ether used in Example 1, 5.0 g of propylene carbonate and further adding 0.83 g of lithium perchlorate and 0.06 g of cumene hydroperoxide. These two components were mixed at room temperature in a weight ratio of 1:1, and immediately cast on a polypropylene plate to obtain a gel like film after 60 minutes.

Ionic conductivity was measured by the same method as Example 1. Conductivity was $5.1 \times 10^{-5}$ S/cm at 0° C.

EXAMPLE 3

Component A was prepared by mixing 5.0 g of methoxypolyethylene glycol monomethacrylate used in Example 1 with 2 g of methoxypolyethylene glycol dimethacrylate (9G; manufactured of Shin-nakamura Chemical Industry Co.) having an oxyethylene unit number of 9 and adding 0.1 g of ethanethiol.

Component B was prepared by mixing 10.0 g of polyethylene glycol dimethyl ether used in Example 1, 0.83 g of lithium perchlorate and 0.06 g of benzoyl peroxide.

These two components were mixed in a weight ratio of 1:1 and immediately cast on a polypropylene plate. A film having a higher toughness than the film of Example 1 was obtained.

Ionic conductivity was measured by the same method as Example 1 and was $1.0 \times 10^{-5}$ S/cm.

COMPARATIVE EXAMPLE 1

In a mixture of 10.0 g of methoxypolyethylene glycol monomethacrylate used in Example 1 and 10.0 g of polyethylene glycol dimethyl ether used in Example 1, 0.83 g of lithium perchlorate was dissolved and 0.06 g of benzoyl peroxide was added. The mixture thus obtained was cast on a polypropylene plate. However, a film could not be formed at room temperature.

EXAMPLE 4

Component A and component B which were obtained in Example 2 were mixed in a weight ratio of 1:1. A non-woven polypropylene fabric having a thickness of 5 um was impregnated with the thus-obtained mixture at the room temperature. Residual mixture on the surface of the non-woven fabric was wiped off and the impregnated fabric was allowed to stand for 45 minutes. Ionic conductivity of the film like product was measured by the same method as Example 1. Conductivity was $3.2 \times 10^{-5}$ S/cm at 0° C.

EXAMPLE 5

Component A was prepared by mixing 10 g of methoxypolyethylene glycol monomethacrylate (M90G; manufactured by Shin-nakamura Chemical industry Co.) having an oxyethylene unit number of 9 and 0.1 g of dimethylaniline.

Component B was prepared by mixing 10.0 g of propylene carbonate, 0.85 g of lithium perchlorate and 0.07 g of benzoyl peroxide. These two components were mixed in a weight ratio of 1:1 at 25° C. and immediately cast on a polypropylene plate at room temperature. A gel like film having no bleeding was obtained after 15 minutes. Ionic conductivity measured with an A.C. impedance method was $4 \times 10^{-4}$ S/cm at 0° C.

EXAMPLE 6

Component A was prepared by mixing 10.0 g of methoxypolyethylene glycol monomethacrylate (M90G; manufactured by Shin-nakamura Chemical Industry Co.) having an oxyethylene unit of 9 and 0.1 g of N,N-dimethylaniline.

Component B was prepared by mixing 10.0 g of sulfolane, 0.75 g of lithium perchlorate and 0.06 g of benzoyl peroxide.

These two components were mixed in a weight ratio of 1:1 and immediately cast on a polypropylene plate at room temperature. A gel like film without fleeding was obtained after 15 minutes. Ionic conductivity measured with an A.C. impedance method was $7.8 \times 10^{-5}$ S/cm at 0° C.

EXAMPLE 7

Component A was prepared by mixing 10.0 g of methoxypolyethylene glycol monomethacrylate (M90G; manufactured Shin-nakamura Chemical Industry Co.) having an oxyethylene unit number of 9 and 0.1 g of N,N-dimethylaniline.

Component B was prepared by adding 0.77 g of lithium perchlorate and then 0.05 g of benzoyl peroxide to 10.0 g of a mixture of propylene carbonate and ethylene carbonate in a weight ratio of 4:1.

These two components were mixed in a weight ratio of 1:1 at 25° C. and immediately cast on a polypropylene plate at room temperature. A gel like film without bleeding was obtained after 15 minutes.

Ionic conductivity of the film measured with an A.C. impedance method was $7 \times 10^{-4}$ S/cm at 0° C.

EXAMPLE 8

Component A was prepared by mixing 10 ml of methoxypolyethylene glycol monomethacrylate (M90G; manufactured by Shin-nakamura Chemical Industry Co.) having an oxyethylene unit number of 9 and 10 mg of N,N-dimethylaniline.

Component B was prepared by mixing 10 ml of propylene carbonate, 0.75 g of lithium perchlorate, 0.05 g of benzoyl peroxide and 3 mg of 1,1-diphenyl-2-picrylhydrazyl (DPPH).

The component A was mixed with the component B at 25° C. in a weight ratio of 2:1. Viscosity of the resulting mixture was not increased for 40 minutes after mixing and indicated that the reaction was in an induction period. Thereafter viscosity increase was initiated and curing was completed after 120 minutes to obtain a gel like film.

Ionic conductivity measured with an A.C. impedance method was $3.3 \times 10^{-3}$ S/cm at room temperature. Due to the presence of the induction period, a solid polyelectrolyte could be prepared in the form of homogeneous thin-film.

COMPARATIVE EXAMPLE 2

The same procedures as described in Example 8 were carried out except that DPPH was omitted. Viscosity increase was initiated immediately after mixing A and B components. Curing was completed within 25 minutes.

Ionic conductivity of the obtained film was measured with an A.C. impedance method. The Ionic conductivity was $2.8 \times 10^{-3}$ S/cm.

EXAMPLE 9

The same procedures as described in Example 8 was carried out except that 10 ml of propylene carbonate was replaced by 10 g of polyethylene glycol dimethyl ether (U-NOX DM200; manufactured by Lion Co.) having an oxyethylene unit number of about 4.

The A and B components were mixed in a weight ratio of 1:1. An induction period was observed for 30 minutes and thereafter viscosity increase was initiated. Curing was completed after 90 minutes to obtain a gel like film. Ionic conductivity of the film was measured with an A.C. impedance method. The conductivity was $1.5 \times 10^{-3}$ S/cm at room temperature.

EXAMPLE 10

The same procedures as described in Example 8 were carried out except that 0.92 g of tetraethylammonium perchlorate was added to the component B in place of 0.75 g of lithium perchlorate. The A and B components were mixed in a weight ratio of 1:1. An induction period was observed for 35 minutes. Thereafter viscosity increase was initiated and curing was completed after 100 minutes to afford a gel like film.

Ionic conductivity of the film was measured with an A.C. impedance method. The conductivity was $1.2 \times 10^{-3}$ S/cm at room temperature.

EXAMPLE 11

Component A was prepared by mixing 10.0 g of methoxypolyethylene glycol monomethacrylate used in Example 8, 20 mg of triethylamine and 1,3,5-triphenylverdazyl (VDZ).

Component B was prepared by mixing 5.0 g of polyethylene glycol dimethyl ether, 50 g of propylene carbonate, 0.80 g of lithium perchlorate and 0.06 g of cumene hydroperoxide.

The A and B components were mixed at 25° C. in a weight ratio of 1:1. Viscosity increase of the mixture was not observed initially for 25 minutes, thereby indicating that the reaction was in an induction period. Thereafter viscosity increase was initiated and curing was completed after 105 minutes to give a gel like film.

Ionic conductivity of the film was measured with an A.C. impedance method. Ionic conductivity was $2.1 \times 10^{-3}$ S/cm at room temperature. Due to the induction period, a solid polyelectrolyte was very readily prepared in the form of homogeneous film.

EXAMPLE 12

The component A and the component B obtained in Example 8 were mixed in a ratio of 1:1. A polypropylene non-woven fabric having a thickness of 40 um (manufactured by Japan Vilene Co.) was impregnated with the resulting mixture immediately after mixing.

Due to a sufficiently long induction period, a translucent and solid polyelectrolyte film could be prepared with extreme ease.

Ionic conductivity of the film was measured with an A.C. impedance method. The conductivity was $1.6 \times 10^{-3}$ S/cm at room temperature.

What is claimed is:

1. A process of preparing a polymeric solid electrolyte comprising polymerizing a mixture of component A and component B, at least one of which contains an alkali metal salt and/or an ammonium salt; the component A being a solution obtained by dissolving a radical polymerization promotor in a compound represented by the formula (1)

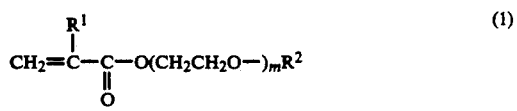

wherein $R^1$ is a hydrogen atom or an alkyl group having from 1 to 5 carbon atoms, $R^2$ is a alkyl group having from 1 to 5 carbon toms, and m is an integer of $2 \leq m \leq 30$; the component B being a solution obtained by dissolving a radical polymerization initiator in a compound represented by the formula (2):

$$R^3-O-(CH_2CHO-)_nR^5 \quad (2)$$
$$\quad\quad\quad\quad |$$
$$\quad\quad\quad R^4$$

wherein $R^3$ and $R^5$ are alkyl groups having from 1 to 5 carbon atoms, $R^4$ is a hydrogen atom or an alkyl group having from 1 to 3 carbon atoms, and n is an integer of $2 \leq n \leq 30$, and/or in a compound represented by the formula (3):

$$R^6-(O-)_pR^7-(X-)_qR^8-(O-)_rR^9 \quad (3)$$

wherein X is

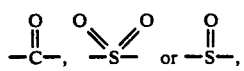

$R^6$ is a hydrocarbon group having from 1 to 6 carbon atoms, $R^7$ and $R^8$ are single bonds or divalent hydrocarbon groups having from 1 to 3 carbon atoms, $R^9$ is a hydrocarbon group having from 1 to 6 carbon atoms or a cyano group, $R^6$ and $R^9$ may be connected with each other from a ring, and p, q and r are individually 0 or 1 $p+q+r>0$, $R^9$ is cyano exclusive.

2. The preparation process of claim 1 wherein a radical polymerization retarder is added to at least one of the component A and the component B.

3. The preparation process of claim 1 wherein the compound represented by the formula (1) has an oxyethylene unit number m of $1 \leq m \leq 20$.

4. The preparation process of claim 1 wherein the compound represented by the formula (1) has an oxyethylene unit number m of $3 \leq m \leq 15$.

5. The preparation process of claim 3 wherein the compound represented by the formula (1) is a compound or a mixture thereof selected from the group consisting of methoxylpolyethylene glycol methacrylate, ethoxypolyethylene glycol methacrylate, methoxypolyethylene glycol acrylate and ethoxypolypolyethylene glycol acrylate.

6. The preparation process of claim 4 wherein the compound represented by the formula (1) is a compound or a mixture thereof selected from the group consisting of methoxypolyethylene glycol methacrylate, ethoxypolyethylene glycol methacrylate, methoxypolyethylene glycol acrylate and ethoxypolyethylene glycol acrylate.

7. The preparation process of claim 1 wherein the radical polymerization promotor is a compound or a mixture thereof selected from the group consisting of aniline, N,N-dimethylaniline, N,N-diethylaniline, triethylamine, $FeSO_4$, $FeCl_2 \cdot nH_2O$, ethanethiol, benzenethiol, sodium ethanethiolate and diethyl sulfide.

8. The preparation process of claim 1 wherein the concentration of the radical polymerization promotor in the component A is in the range of from 0.05 to 5 wt. %.

9. The preparation process of claim 1 wherein a polyether compound having acryloyl groups at both ends is added to the component A in the range of from 2 to 30 parts by weight per 100 parts by weight of the compound represented by the formula (1).

10. The preparation process of claim 1 wherein the compound represented by the formula (2) has an oxalkylene unit number n of $3 \leq n \leq 15$.

11. The preparation process of claim 1 wherein the compound represented by the formula (2) is a compound or a mixture thereof selected from the group consisting of dimethoxypolyethylene glycol, diethoxypolyethylene glycol, dipropoxypolyethylene glycol, dimethoxypolypropylene glycol, diethoxypolypropylene glycol, dimethoxypolyethylene-propylene glycol and dimethoxypolyethylene-butylene glycol.

12. The preparation process of claim 1 wherein the compound represented by the formula (3) is a compound or a mixture thereof selected from the group consisting of ethylene carbonate, propylene carbonate, γ-butyrolactone, dimethoxyethane, acetonitrile, dimethyl sulfoxide, dioxolane and sulfolane.

13. The preparation process of claim 1 wherein the radical polymerization initiator is a compound or a mixture thereof selected from the group consisting of benzoyl peroxide, t-butylperoxy isobutyrate, acetyl peroxide and methyl ethyl peroxide.

14. The preparation process of claim 1 wherein the concentration of the radical polymerization initiator in the component B is in the range of from 0.05 to 5 wt. %.

15. The preparation process of claim 1 wherein the weight ratio of the compound represented by the formula (1) to the compound represented by the formula (2) in simultaneous use is in the range of from 90:1 to 10:90.

16. The preparation process of claim 2 wherein the radical polymerization retarder is a compound or a mixture thereof selected from the group consisting of 1,1-diphenyl-2-picrylhydrazyl (DPPH), 1,3,5-triphenylverdazyl (VDE), 2,6,-di-t-butyl-a-(3,5-di-t-butyl-4-oxo-2,5-cyclohexadiene-1-ylidene-p-tolyloxyl (Galvinoxyl), 2,2,6,6-tetramethyl-4-piperidone-1-oxyl, N-(3-N-oxyanilino-1,3-dimethylbutylidene)-aniline oxide, tri-p-nitrophenylmethyl, ferric chloride, ferric bromide, cupric chloride, dichloroquinone, hydroquinone and dithiobenzoyl disulfide.

17. The preparation process of claim 2 wherein the content of the radical polymerization retarder is in the range of from 0.01 to 1.0 mole per mole of the radical polymerization initiator.

18. The preparation process of claim 1 wherein the alkali metal salt is a compound or a mixture thereof selected from the group consisting of lithium perchlorate, sodium perchlorate, potassium perchlorate, lithium tetrafluoroborate, sodium tetrafluoroborate, potassium tetrafluoroborate, lithium hexafluorophosphate, potassium hexafluorophosphate, lithium trifluoroacetate and lithium trifluoromethane sulfonate.

19. The preparation process of claim 1 wherein the ammonium salt is a compound or a mixture thereof selected from the group consisting of tetraethylammonium perchlorate, tetraisopropylammonium perchlorate, tetra-n-butylammonium perchlorate, tetraethylammonium tetrafluoroborate, tetra-n-butylammonium tetrafluoroborate, teraethylammonium hexafluorophosphate, tetra-n-butylammonium hexafluorophosphate and tetra-n-butylammonium trifluoromethane sulfonate.

20. The preparation process of claim 1 wherein the content of the alkali metal salt or the ammonium salt is in the range of from 3 to 20 parts by weight per 2100 parts by weight of the sum of the component A and the component B.

21. The preparation process of claim 1 wherein the weight ratio of the component A to the component B is in the range of from 1:5 to 5:1.

22. The preparation process of claim 1 wherein the component A and the component B are mixed in an inert atmosphere in the temperature range of from 5° to 40° C.

23. The preparation process of claim 1 wherein the electrolyte is cured at a temperature in the range of from 5° to 40° C.

24. The preparation process of claim 23 wherein the curing time is in the range of from 10 minutes to 3 hours.

UNITED STATES PATENT AND TRADEMARK OFFICE
CERTIFICATE OF CORRECTION

PATENT NO. : 5,194,490
DATED : March 16, 1993
INVENTOR(S) : SUGA et al.

It is certified that error appears in the above-indentified patent and that said Letters Patent is hereby corrected as shown below:

Column 11, line 24 change "from" to --to form--.

Signed and Sealed this

Fifth Day of April, 1994

Attest:

BRUCE LEHMAN

*Attesting Officer*  *Commissioner of Patents and Trademarks*